United States Patent [19]
Allen et al.

[11] Patent Number: 5,633,662
[45] Date of Patent: May 27, 1997

[54] INK LIMITING IN INK JET PRINTING SYSTEMS

[75] Inventors: William J. Allen, Portland, Oreg.; Steven O. Miller, Vancouver, Wash.

[73] Assignee: Hewlett-Packard Company, Palo Alto, Calif.

[21] Appl. No.: 926,264

[22] Filed: Aug. 5, 1992

[51] Int. Cl.$^6$ .................... B41J 2/205; B41J 29/393; B41J 2/21; H04N 1/46

[52] U.S. Cl. ..................... 347/15; 347/19; 358/501

[58] Field of Search ............ 346/140 R, 1.1; 347/43, 15, 19; 358/501; 364/930.41; 395/109; 434/98

[56] References Cited

U.S. PATENT DOCUMENTS

| | | | |
|---|---|---|---|
| 3,684,825 | 8/1972 | Dischert et al. | 348/679 |
| 4,631,548 | 12/1986 | Milbrandt | 346/140 R X |
| 4,682,186 | 7/1987 | Sasaki et al. | 347/15 |
| 4,930,018 | 5/1990 | Chan et al. | 346/140 R X |
| 5,161,974 | 11/1992 | Bowges | 434/98 |

*Primary Examiner*—Benjamin R. Fuller
*Assistant Examiner*—David Yockey

[57] ABSTRACT

A process is disclosed for controlling ink volume in liquid ink printing systems such as ink jet printers. The process examines the total ink volume per pixel as specified in source image data (typically 24-bit, three color data), i.e. before digital halftoning. For each pixel of data, the specified ink volume is compared to a selected maximum total ink volume per pixel. The maximum total ink volume is selected, depending upon the printing medium and environmental conditions, so as to provide good color coverage while avoiding curl, bleeding and other adverse effects of excessive ink volume. The source image ink volume is reduced so as to form depleted image data in which the ink volumes per pixel do not exceed the selected maximum. Preferably, a threshold ink volume also is selected, below which no ink limiting is applied, thereby avoiding washed-out images at lower ink volumes. Above the threshold, the ink volume is scaled to a value below the maximum, preferably by linear scaling.

16 Claims, 2 Drawing Sheets

INK LIMITING IN INK JET PRINTING SYSTEMS

Background of the Invention

This invention relates to the field of liquid ink printing systems and, more particularly, to methods for improved print quality and color density in color ink jet printing systems.

Ink Jet Printing Systems

A typical ink jet printing system includes a platen for supporting a printing medium such as paper on which an image is to be printed. In some models, a drive means such as a motor is provided for advancing the platen and thereby advancing the paper. In other models, the platen is fixed and drive rollers advance the paper. A print head having one or more nozzles for ejecting drops of ink or a similar liquid printing solution is mounted on a motor-driven carriage. The carriage is moveable along a path transverse to the paper advancement path, and supports the print head with the nozzle(s) facing the platen in an adjacent yet slightly spaced-apart relationship. Platen (paper) position and carriage location combine to position the print head opposite a desired location on the paper.

Ink jet print heads, often called "print cartridges", include at least one and often a plurality of print nozzles. In the latter case, the print nozzles typically form a linear array, arranged vertically with respect to the printing medium (i.e., along a line parallel to the direction of paper advancement). For color ink jet printing, the pen typically includes nozzles for ejecting cyan, magenta and yellow colored inks, called the primary printing colors, or simply "primaries." Four-color systems additionally include nozzles for ejecting black ink. A print head array may also include several nozzles for ejecting each color of ink. In one commercial embodiment, the pen has sixteen nozzles for each of the three (C, M and Y) primaries. A controller, for example, a microprocessor system including associated memory and interfacing electronics, controls paper advancement, carriage motor and print head in a printer.

Printing occurs as the print head traverses across the width of the paper (a "pass"). During each pass all sections of the head are printing, each section printing on a different horizontal band of the paper. Between passes of the print head, the paper is advanced a distance equal to the height of one color section of the head. Paper advances past the printing head from the bottom, passing the cyan primary first. Printing is not completed until all three primaries have passed over the same band on the paper, to allow mixing the primary colors. The drops of ink strike the paper or other medium and then dry to form dots that, when viewed together, Create the permanently printed image. Desired image colors (other than the primaries) are created by combining drops of ink of the primary colors. In other words, drops of two or more colors of ink are deposited on nominally the same location on the paper. The individual dots, typically located on 1/300 inch centers, together form what appear to be reasonably solid fields of a desired color at a comfortable viewing distance.

The fundamental unit of printing area on the paper is commonly referred to as a pixel. The nominal pixel size or spacing is equal to the spacing between nozzles on the print head. The speed of the carriage and the frequency of ejecting drops of ink are controlled to allow depositing successive drops of ink along a horizontal line (or raster) having a spacing similar to the vertical spacing of the nozzles on the print head. If the horizontal print spacing is the same as the vertical spacing between nozzles, each pixel or grid location is nominally square. Other aspect ratios are used as well. The paper may thus be considered as a regular array of pixel areas, for example, consisting of 300 pixel areas per inch in both dimensions.

Alternatively, pixels may be visualized as lying on the nodes of a raster of regularly arranged points in two dimensions. In either case, the pixels are not physically marked on the printing medium other than by dots upon printing. They form a useful convention because they permit an assessment of the dotted image quality actually printed compared to a hypothetical ideal standard pixel array. Since it is the visual appearance of the image that is most important, the use of the pixel location concept also permits comparisons of different methods of forming images using various dot deposition strategies.

Effects of Printing Media and Excessive Amounts of Ink

An important consideration in printing strategies in an ink jet printing system is the intended printing medium. For example, overhead transparencies (OHT) have less affinity for absorbing ink than does a typical paper. As a result, drops of ink deposited on an OHT tend to bead rather than diffuse, as compared to drops deposited on paper. Additionally, the drops of ink deposited on OHT take longer to dry.

U.S. Pat. No. 4,748,453 (Lin et al.) discloses a method of depositing spots of liquid ink upon selected pixel centers on overhead transparencies so as to prevent the flow of liquid ink from one spot to an overlapping adjacent spot. According to that method, a line of information is printed in at least two passes. On a first pass, spots of liquid ink are printed on selected pixel centers in a checkerboard pattern, so that only diagonally adjacent pixel areas are printed. On the second pass, the complementary checkerboard pattern is deposited, thereby completing deposit of ink on all of the pixels in a desired area. That technique allows some drying time between passes.

U.S. Pat. No. 4,617,580 (Miyakawa) is directed to improving color saturation in printed overhead transparencies, by printing multiple drops on each pixel location, each drop being slightly offset horizontally and/or vertically from an adjacent drop.

Printing on paper, however, presents a somewhat different problem. Paper has an affinity for the liquid ink so that substantial absorption and diffusion of each drop of ink generally occurs. On the one hand, diffusion from one drop of ink to a drop that occupies an adjacent pixel area is helpful in achieving color mixing and obtaining a solid appearance. Along a boundary between two adjacent fields of different colors, however, such diffusion results in color bleeding across the boundary, making the boundary appear fuzzy. This is an undesirable result. Other problems associated with printing excessive ink are cockle, curl, wet output, short pen life (for a non-refillable print cartridge), and poor image tone. Excessive ink volumes generally occur as a result of color mixing, described below. However, the present invention, as will be shown, is useful for ink limiting in monochrome applications as well.

Most color ink jet printers form desired image colors by mixing, i.e. by depositing two or more droplets of ink of different primary colors, one over the other, on a selected pixel area of the substrate. The net visual effect is a dot of a secondary color determined by the principles of transmitted or reflected color formation. Black is formed in either of two ways. First, by simply providing black ink, for example in a four-color system. Alternatively, black may be formed by combining all three primaries, C,M and Y. This is called composite black, whereas the first type is true black. True black is indicated by the letter K (to avoid confusion with the color blue). Overprinting three drops of ink on each pixel area results in high ink coverage for a solid appearance. However, the high ink volume (300%, where one drop per pixel defines 100%) also leads to substantial bleeding across color field boundaries, resulting in poor image quality.

Additionally, certain medium types and environmental conditions have undesirable effects on print quality. Specifically, these adverse effects are bleeds from darker colors into lighter ones and bronzing (a usually bronze colored shiny surface) of composite black. High humidity environments increase bleed and bronzing. Some types of plain paper are prone to bleed and bronzing even in normal (air conditioned office) environmental conditions.

Gamma correction is not sufficient to control most of the aforementioned problems. Although gamma correction does affect the amount of ink deposited in intermediate tones, the darkest portion of the image are unaltered by gamma correction. It is in the darkest portion of an image, however, where the excessive ink problem is most acute.

U.S. Pat. No. 5,012,257 to Lowe et al. describes a "superpixel" printing strategy to reduce bleed across color field boundaries. That strategy limits printing to no more than two drops of ink per cell or pixel, and no more than a total of three drops per superpixel, a super pixel consisting of a 2'2 array of pixel cells. This strategy controls bleed, but at a penalty in terms of color and spatial resolution.

The need remains, therefore, to improve print quality in liquid ink printing systems. A need further remains to provide good printed image quality across a variety of environmental conditions and print media. Improved print quality requires good color saturation, while avoiding excessive amounts of ink.

SUMMARY OF THE INVENTION

One aspect of the invention is limiting the total volume of ink specified in image data for each pixel, thereby limiting the total volume of ink printed on the page. The first step is to determine a maximum total ink volume per pixel (or "maximum volume"). Linear reduction or scaling of the source image data may be applied to limit the ink volume per pixel to the maximum volume. The specified ink volume for each pixel is reduced by a constant scaling factor equal to the ratio of a selected maximum total ink volume per pixel to the applicable full-range of ink volume. In an alternative (preferred) embodiment of the invention, a threshold total ink volume per pixel (or "threshold volume") also is determined, and ink limiting is invoked only when the total ink volume specified for a pixel exceeds a selected threshold value. Pixel ink volumes below the threshold volume are not affected, to avoid washing out colors at lower ink volumes. Above the threshold volume, the specified ink volume is reduced, preferably by linearly scaling the ink volume, so as to form depleted ink volumes. The actual threshold and maximum ink volumes are dependent upon printing medium and environmental conditions, as well as subjective user judgment. These volumes may be selected by user input, for example through an "intensity" switch or "slider". Ink limiting is performed before digital halftoning, so the exact pattern of dots ultimately placed on the paper will vary, depending on the halftoning technique used. Nonetheless, the volume of ink actually applied to the page is controlled so as to improve print quality and minimize bleeding and other undesirable effects of excessive amounts of ink.

Figure 1:
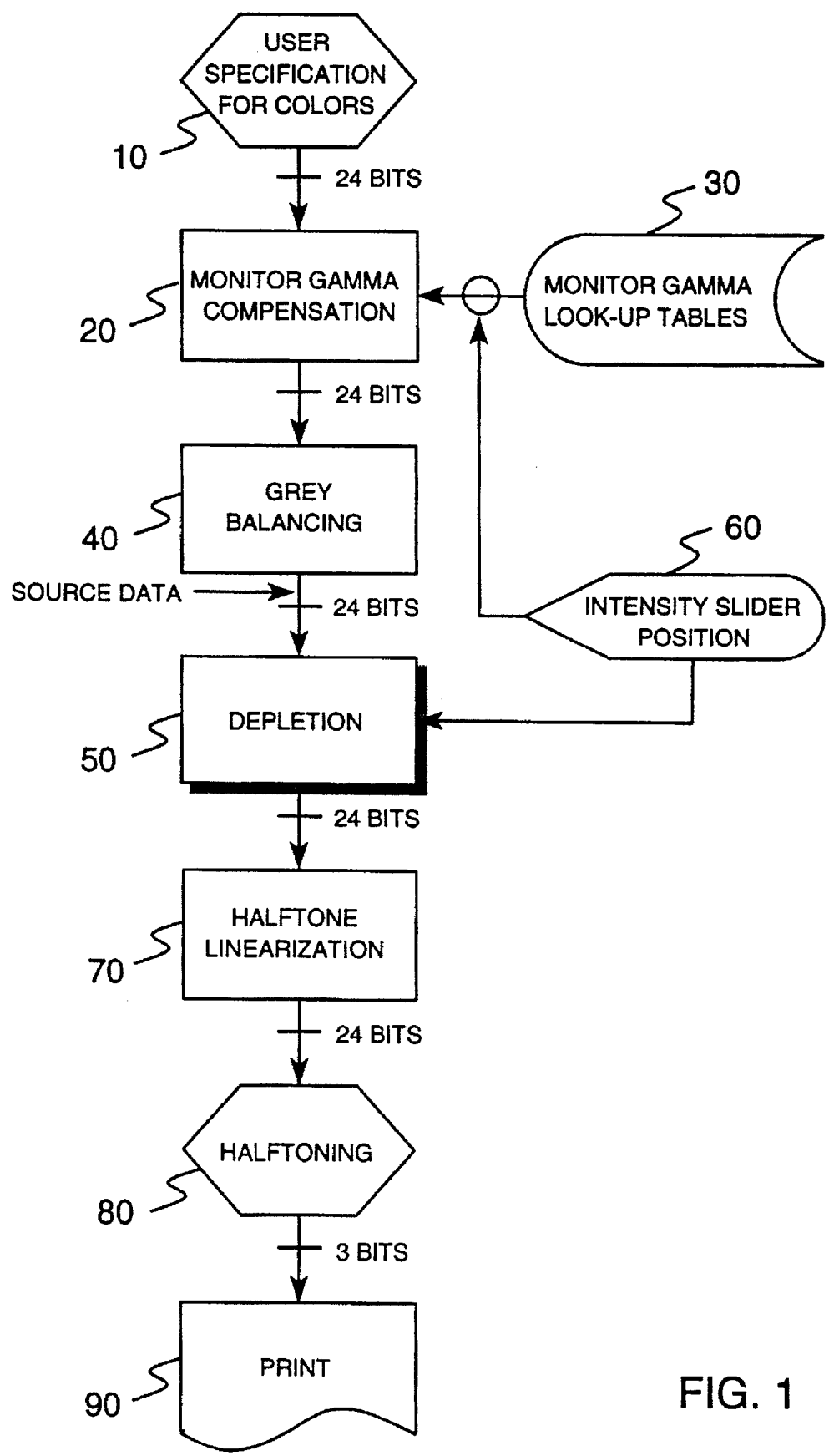
FIG. 1 is a flow diagram illustrating a process for converting source image data into 3-bit or printer control data according to the present invention.

APPENDIX A is an example of a computer program for implementing the preferred embodiment of the invention.

DETAILED DESCRIPTION OF THE PREFERRED EMBODIMENT

Color image data typically comprises eight bits of data for each primary color, or a total of 24 bits for a three-color system, for each pixel. Eight bits provides a range of 0 to 255 "counts" for each color, 255 being the maximum, equivalent to 100% color saturation. In monochrome systems, eight bits provides a 0–255 count gray scale. Certainly other resolutions, both higher and lower, are used. In any event, we refer to this as source or input image data.

Digital halftoning is used to effect the perception of millions of colors, even though the pen itself contains only three colors of ink: cyan, magenta and yellow. Put another way, digital halftoning, also referred to as spacial dithering, is the method of rending the illusion of continuous-tone pictures on displays that are capable of producing only binary picture elements (pixels). There are various digital halftoning techniques. The halftoning algorithm must be selected and adapted so as to match the specific parameters of any target display device, such as a printer, taking into account its resolution, aspect ratio, etc.

Accordingly, after various data processing steps, mentioned below, the source image data undergoes a digital halftoning process to reduce it to the resolution of the target device, here an ink jet printer. An ink jet printer typically has a three or four-color (C,M,Y,K) print cartridge. Hence, the printer can resolve only 3 or 4 bits per pixel, one bit for each primary color. The selected digital halftoning process receives the source image data as its input, and provides printer data (typically 3-bit data) as its output. We will use the terms "3-bit data" or "printer data" herein to mean generally image data after halftoning, even though the actual number of bits may vary with the particular application. The 3-bit data drives an ink jet printing apparatus in the usual fashion.

The prior art printing strategies discussed above operate only on the 3-bit data. At that juncture, however, a great deal of image information has been lost to the halftoning process. One aspect of the present invention is to control or limit the amounts of ink specified in the source data, i.e. prior to halftoning. Adjusting the source image data is advantageous because more information is present. Thus, finer adjustment may be made, resulting in improved print quality. Preferably, such "pre-processing"(along with digital halftoning) is carried out in a host machine such as a digital computer, rather than in the printer itself, though this is not essential. Pre-processing the image data in the host computer has the advantage of minimizing the processing load on the printer, thereby keeping printer costs as low as possible.

According to the present invention, a new ink limiting or depletion process occurs before digital halftoning. The depletion reduces the CMY values (or increases the RGB values) as necessary to control output quality. The exact pattern of dots ultimately placed on the paper will vary depending on the halftoning technique used. But the number of dots, and hence the amount of ink, is reduced in the present invention, to improve print quality.

FIG. 1 is a flow diagram illustrating processing of color (or monochrome) graphic image data. Step 10 is to provide graphic image data. It may be generated by an application program, or may be acquired by a scanner or other input device. Commonly, the data comprises 24 bits for each pixel location, i.e. 8-bits for each primary color. This word size is arbitrary and may vary depending upon the application, size of available memory, resolution of the input device, etc. Eight bits per color frequently is used because it provides good color resolution and is convenient for high speed processing on low cost microprocessor-based hardware.

Optionally, the 24-bit image data may be adjusted by gamma compensation, step 20. Gamma compensation is a one-dimensional transformation which adjusts the data to a more perceptually linear form. The gamma compensation process may include the use of look up tables 30. Next the gamma corrected data undergoes gray balancing, step 40, details of which are known and not essential here.

Next is the ink limiting or depletion process 50, described in detail below. The depletion process 50 yields modified or "depleted" image data which subsequently undergoes halftone linearization, step 70, and then digital halftoning, step 80. Halftone linearization may not be used in some systems. In any event, specifics of halftone linearization and digital halftoning are known. The digital halftoning step yields 3-bit printer data as discussed above. The 3-bit data is used for printing the image, step 90, onto the printing medium.

Linear Ink Limiting

Figure 2:
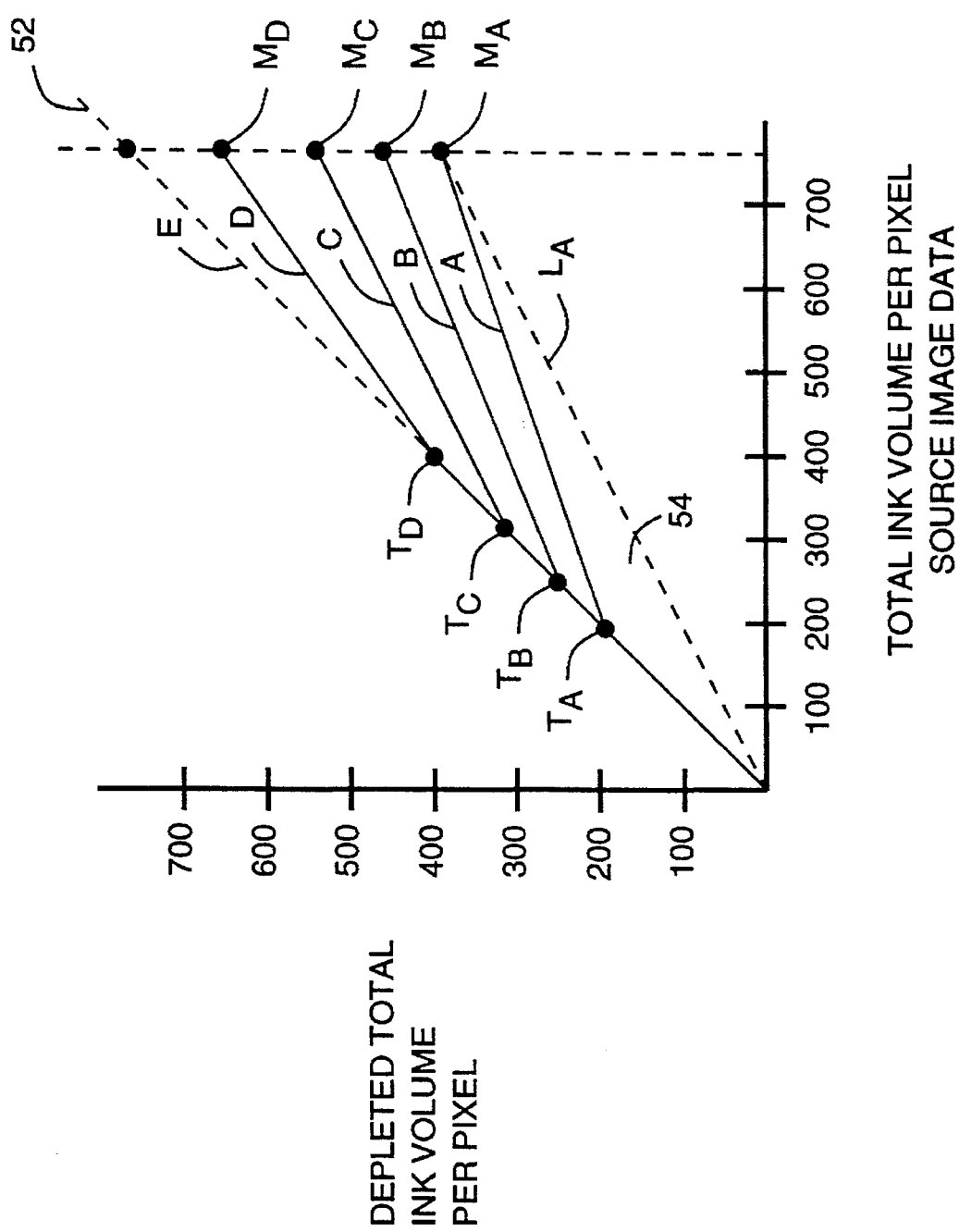
FIG. 2 is a graph illustrating an example of the ink depletion process of the flow diagram of FIG.1

According to one embodiment of the invention, the ink limiting step is a linear reduction in the total amount of ink specified per pixel, in each and every pixel of data. According to linear reduction, we first determine a maximum total ink volume per pixel ("maximum volume"), and then linearly reduce the ink volume specified in the source image data so that the total ink volume for each pixel does not exceed the maximum volume. The amounts of cyan, magenta and yellow ink specified in the source image data are each multiplied by a scaling factor which may be determined by a ratio of the maximum ink volume to the full-range or maximum data value. To illustrate, for 8-bit source data (per color), the maximum data value is 255. If the maximum ink volume is selected to be 200, the source data for each color (and hence for the pixel) is scaled down by $200/255$ or about 0.785. This process is illustrated in the graph of FIG. 2, described below. An appropriate maximum volume (and from it the scaling factor) may be determined empirically and depends upon the printing medium and environmental conditions, as further explained below. This linear scaling method has the advantage of ease of calculation. However, in some applications, the amount of linear depletion required to control composite black-to-color bleed caused primary colors (CMY) to be washed out. For example, printing 80% of the dots for composite black is acceptable, but printing 80% of the dots for magenta alone is insufficient to adequately cover the paper.

Alternative Embodiment

An alternative embodiment of the invention controls ink bleeding and bronzing without adversely affecting the primary colors. Let S be the total amount of ink specified in the source data for a particular pixel. The total amount of ink is the sum of the amounts of ink specified for each primary color. Thus S=C+M+Y. According to the alternative embodiment, if (and only if) S is below a predetermined value, no depletion is performed. This value, which we call the threshold total ink volume per pixel (or simply "threshold volume"), also varies depending upon the printing medium and environmental conditions. Generally, at relatively low ink volumes, bleeding, cockel, curl and other problems associated with excessive ink do not occur. Moreover, since the amounts of ink are relatively low to begin with, reducing the amount of ink to be printed is undesirable as the printed image will be too light or washed out. Accordingly, no depletion is performed below the threshold value.

Where the total ink volume specified in the image data for a particular pixel is greater than the threshold volume, the invention calls for reducing the amount of ink specified for the pixel, thereby forming modified image data having a reduced total ink volume for each such pixel. The ink volume is reduced to a level still greater than that resulting from the linear ink limiting described above, yet in all cases less than (or at most equal to) the maximum volume. Preferably, a linear scaling of CMY is applied between the threshold volume and the maximum volume per pixel. This process is illustrated in the graph of FIG. 2.

FIG. 2 is a graph illustrating the depletion process 50 of FIG. 1. Referring to FIG. 2, the horizontal axis corresponds to the total ink volume specified in the source image data for a given pixel. This illustration is for the case of 8-bit data (per color). Since each color is specified in the range of 0–255, the total ink volume, which is the sum of the three color components, has a maximum value or "fullrange" of 765 units or "counts"—a relative number. The vertical axis represents the depleted total ink volume per pixel. This is the total ink volume, for the selected pixel, after the depletion step 50. Line 52 represents no depletion. Thus, it is simply a straight line extending at 45° from the origin.

The linear depletion process is illustrated by a dashed line LA. Line LA shows linear depletion for a maximum total ink volume of MA. Thus, in the absence of ink limiting, the depleted volume is the same as the source image data volume, as illustrated by line 52, which is dashed in part, but further extends to the origin. Where linear ink limiting is invoked, the source image ink volume, for every pixel, is reduced to a value illustrated by the dashed line LA, so that the maximum ink volume, corresponding to the full-range source value (here 765) equals the selected maximum MA (about 380 in the illustration).

In the alternative embodiment, a non-linear or "two-point" reduction is implemented. The first step of this depletion process is to select a threshold total ink volume below which no limiting (or depletion) is required. The threshold value depends upon the printing medium, ink, environmental and other factors. It is selected so as to allow good ink coverage without bleeding and other problems that result from excessive ink volumes. For each pixel, the source image data is examined to determine the total ink volume specified. If the total ink volume is greater than the threshold total ink volume, the amount of ink specified for that pixel is reduced. Each of the color components is reduced by the same factor, so the total ink volume for the pixel is reduced by that factor. Pixels of data that specify total ink volumes below the threshold value are not depleted.

The exact amount of depletion necessary to optimize the printed image is difficult to predict. In the preferred embodiment, threshold and maximum total ink volumes are determined empirically, and the depletion is accomplished by linear scaling between those two points for ease and speed of calculation, as further described below. The maximum total ink volume is selected for maximum ink coverage, color intensity, etc. without the problems described above that result from applying excessive amounts of ink. A more complex function of the amounts of primary colors specified for a pixel may be used, but the "two-point depletion" method achieves substantial improvements in print quality and is easy to implement.

Another embodiment might implement a more complex transfer function that defines a curve lying within triangular region 54 in FIG. 2 (i.e. the region bounded by the origin, TA and MA). Within region 54, the depleted total ink volume per pixel would be greater than that resulting from linear depletion, yet less than that resulting from the two-point process described. Other functions may be more difficult to calculate, but could be implemented by look up tables. For example, a more complex function may be approximated by three or more "data points," comprising a threshold volume, a maximum volume, and one or more intermediate data points. All of the data points may be stored in a lookup table. Each source image pixel would be scaled by linear interpolation between the lookup table data points.

The two-point depletion method thus reduces the specified volume of ink for values between two data points: a threshold total ink volume and a maximum total ink volume. The curve labeled "C"(FIG. 2), for example, illustrates the concept. Curve C illustrates an example of a transfer function for modifying source image data to limit ink volume. Curve C is defined by a threshold value of 319 counts, and a maximum value of approximately 535. Below the threshold value, curve C defines a straight line between the threshold value and the origin. In that region, therefore, the transfer function is unity, to indicate that the source data is not altered.

Above the threshold value, total ink volume is reduced, so curve C shows a transfer less than unity. It follows a straight line defined by the threshold value and the maximum total ink volume. Therefore, the total ink volume is scaled by a scaling factor equal to the slope of the line between the threshold value and the maximum total ink volume. Thus, for an input total ink volumes in excess of the 319-count threshold value, each of the color components is linearly scaled down as illustrated in the graph. Accordingly, our method of selectively depleting ink volume to improve quality of the printed image includes the steps of first, selecting a threshold total ink volume per pixel and a maximum volume. These values in turn determine a scaling factor (slope of the transfer curve); second, determining from the digital image data a total ink volume for each pixel. This is the sum of the individual color "counts". Next, for each pixel, if the total ink volume is greater than the threshold total ink volume, we reduce the amount of ink specified for the pixel by the scaling factor. The result is modified image data having a reduced total ink volume per pixel where necessary.

The ideal threshold and maximum total ink volumes per pixel vary with the printing medium. Thus, it is useful to provide a different threshold value and maximum value pair for each one of a selected plurality of printing media. Accordingly, the depletion process further includes identifying which one of the printing media will be used for printing the image; and using the corresponding threshold value in the depletion process. The medium may be identified by useroperable input means, such as a software "button". In other words, a graphic such as a button is used in a printer set-up window to indicate the medium.

Note that the depletion process is useful in monochrome systems as well. For example, black ink may be partially depleted to improve the image quality. This is particularly so in a dual-pen system in which the black ink may be printed adjacent color ink, so bleeding is to be avoided. Even the black ink depletion may be optimized according to medium and environment as disclosed herein.

Environmental factors including humidity and temperature also are important in determining when and how much to adjust ink values. Preferably, the depletion process further includes providing a respective threshold and maximum volume pair for each one of a selected plurality of environmental conditions. The most appropriate threshold/maximum pair for printing under current environmental conditions is used to control the depletion process. Environmental conditions may be indicated by user input for selecting the most appropriate pair. Alternatively, conditions such as temperature may be determined by a suitable sensor provided in or near the printer. A sensor is more reliable but costly.

We have found the best solution to be a single user input for selecting threshold and maximum total ink volumes. The user input may be called "Intensity" applying that term in a broad sense. A desired "intensity" setting may be determined by the user by trial and error, until the best print quality is produced. This necessarily takes into account the print medium, environment, and other variables, yet does not require technical expertise to adjust the printing system. Accordingly, another aspect of the invention calls for providing a threshold and maximum total ink volume pair for each one of a plurality of image intensity settings; selecting one of the image intensity settings; and, using the corresponding volume pair to control the depletion process. The "intensity" selection should default to values empirically determined to provide good print quality in most cases. This reduces the likelihood of the user having to adjust the intensity to produce acceptable output.

One example of effecting various intensity settings is illustrated in FIG. 2. in the figure, curves A,B,C and D each illustrate the two-point depletion method for a different "intensity" setting. For each intensity setting, the corresponding threshold volume is designated "Tx" where x is the intensity setting A,B,C or D. Likewise, each of the respective maximum total ink volumes per pixel is designated "Mx" where x is the corresponding intensity setting.

The "intensity" setting may be selected by a manual or software switch. A software switch may be any means for user input to a processor for controlling the ink limiting process. For example, such input may take the form of alphanumeric keystrokes in a command line. Or, a more graphical user interface may present an image of a series of intensity level "buttons" or a "slider" for user actuation by a mouse button or other pointing device. A slider may present the appearance of continuously variable intensity levels. For economical implementation, however, the slider position is "rounded" to one of a few discrete settings. For example, it may have five different levels or settings, from "Lightest" to "Darkest". Additional settings may be provided. The threshold values for each setting may be stored in a memory for lookup as needed. Or, a mathematical formula may be developed calculating such values on demand, given the selected "intensity" level.

Since the print medium also should be considered, it may be desirable to provide, for each image intensity setting, an alternative pair of threshold/maximum volume values for printing the image on an alternative printing medium. Once again, the next step is determining whether the alternative printing medium is selected for printing the image; and, if so, using the alternative volume pair corresponding to the image intensity setting selected by the user as the selected threshold total ink volume.

The reducing step of the depletion process calls for linearly scaling the specified ink volumes between the threshold and maximum total ink volumes. For linear scaling, a scaling factor is defined by the slope: ($\Delta$depleted volume /$\Delta$source volume), where "$\Delta$depleted volume" equals the maximum total ink volume minus threshold total ink volume, and "$\Delta$source volume" equals "maximum count" minus threshold total ink volume. The maximum count is the full-range or maximum volume of ink that can be specified in the system for a given pixel. For example, maximum count equals 765 in a three-color system having 8-bit per primary source data, since the maximum count is 255 for each color. The applicable scaling factor is applied to each color component of the source data. Ink limiting therefore does not affect the relative amounts of color primaries specified in the data.

Linear reduction within this range may not be theoretically optimal. Nonetheless, we have found it to provide substantial improvements in print quality. It provides for good color saturation while controlling bleeding and bronzing. It also has the advantages of ease of calculation and speed. An example of a C-code routine for implementing the depletion process is appended as Appendix A.

In an operative example of the preferred embodiment of the invention, a host printing system provides for five settings of image intensity, from Lightest to Darkest, and the input image data is 8-bit, three-color data, so that, for each pixel, each color has a value in a range of 0 to 255 counts, where 255 represents 100 percent color saturation. The total ink volume for each pixel therefore is in a range of 0 to 765. We have determined empirically that the threshold and maximum values shown in the following table provide good print quality for 16 different papers (8 U.S. types and 8 European), in a 300 DPI ink jet printer.

TABLE 1

|  | Threshold | Max | Curve (FIG. 2) |
|---|---|---|---|
| Plain Paper |  |  |  |
| Lightest | 191 | 383 | A |
| Next | 255 | 459 | B |
| Middle | 319 | 536 | C |
| Next | 383 | 650 | D |
| Darkest[1] | 765 | 765 | E |
| Special Paper & Transparency |  |  |  |
| Lightest | 255 | 459 |  |
| Next | 319 | 536 |  |
| Middle | 383 | 612 |  |
| Next | 446 | 688 |  |
| Darkest[1] | 765 | 765 |  |

[1]ink limiting disabled

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of controlling ink volume to improve quality of a printed image in a liquid ink printing system arranged to receive digital image data that specifies an ink volume for each one of multiple pixels, the printing system further arranged for printing an image responsive to the image data on to a printing medium, the method comprising the steps of:

selecting a threshold total ink volume;

selecting a maximum total ink volume greater than the threshold total ink volume;

determining from the digital image data an individual total ink volume associated with each one of the multiple pixels;

depleting the individual total ink volume for each one of the multiple pixels having an individual total ink volume greater than the selected threshold total ink volume, the total ink volume for each one of the multiple pixels being individually depleted by an amount according to the maximum total ink volume and proportional to the associated total ink volume forming a depleted total ink volume for each one of the multiple pixels that is less than or equal to the selected maximum total ink volume.

2. A method according to claim 1 wherein said selecting a threshold total ink volume and a maximum total ink volume includes: imum total ink volume for each one of a plurality of image intensity settings;

selecting one of the image intensity settings; and using the corresponding threshold total ink volume and maximum total ink volume corresponding to the selected image intensity setting as the selected threshold total ink volume and maximum total ink volume, respectively.

3. A method according to claim 2 wherein said selecting step includes:

providing a user-operable intensity slider for selecting a desired one of the image intensity settings.

4. A method according to claim 2 further comprising:

providing an alternative set of threshold total ink volume and maximum total ink volume for printing on an alternative printing medium, the alternative set including alternative threshold total ink volume and maximum total ink volume for each one of the image intensity settings; and using the alternative threshold total ink volume and maximum total ink volume as the selected threshold total ink volume and maximum total ink volume for printing on the alternative medium.

5. A method according to claim 1 wherein:

the image data specifies, for each one of an array of pixels, a volume of ink for each one of a predetermined plurality of ink colors; and said reducing step includes:

reducing the specified ink volume for each of said colors so as to form a depleted ink volume for each of said colors, respectively, such that the depleted ink volume for the plurality of ink colors associated with each of said pixels together define a depleted total ink volume for each one of said multiple pixels that is less than the selected maximum total ink volume.

6. A method according to claim 5 wherein said reducing step includes reducing the specified ink volume for each and every one of said colors in each of the pixels by a constant scaling factor.

7. A method according to claim 5 wherein said reducing step includes linearly scaling the specified ink volume for the pixels that exceed the threshold total ink volume by a scaling factor selected such that the maximum depleted total ink volume equals the selected maximum ink volume.

8. A method according to claim 5 wherein said selecting a threshold total ink volume and a maximum total ink volume includes:

providing a respective threshold total ink volume and a respective maximum total ink volume for each one of a plurality of image intensity settings;

selecting one of the image intensity settings; and using the respective threshold and maximum total ink volume corresponding to the selected image intensity setting as the selected threshold total ink volume and maximum total ink volume, respectively.

9. A method according to claim 5 wherein said selecting step includes:

providing a user-operable intensity slider for selecting a desired one of the image intensity settings.

10. A method according to claim 1 wherein said selecting a threshold total ink volume includes selecting said threshold total ink volume with a value of zero.

11. A method according to claim 10 wherein said selecting a maximum total Ink volume includes:

provliding a respective maximum total ink volume for each one of the multiple pixels for each one of a plurality of printing media, wherein the printing medium is one of the plurality of printing media;

identifying which one of the plurality of printing media is used as the printing medium;

utilizing the identified printing medium for printing the image; and using the maximum total ink volume that corresponds to the identified printing medium as the selected maximum total ink volume.

12. A method according to claim 10 wherein said selecting a maximum total ink volume includes:

providing a respective maximum total ink volume for each one of a plurality of predetermined environmental conditions;

identifying which one of the environmental conditions is applicable for printing the image; and using the maximum total ink volume that corresponds to the identified environmental conditions as the selected maximum total ink volume.

13. A method according to claim 12 wherein said identifying the environmental conditions includes providing a user-operable input means for selecting among the predetermined environmental conditions.

14. A method according to claim 13 wherein the input means includes a software switch.

15. A method for controlling liquid ink volume in a printing system having multiple pixels associated with source image data, the source image data for each of the multiple pixels further associated with a pixel color produced by a variable combination of primary color units, the method comprising the following steps:

assigning an individual ink volume to each one of the multiple pixels proportional to a given number of the primary color units, the primary color units combined in various combinations to form the associated pixel color;

selecting a variable threshold volume, the individual ink volume of each one of the multiple pixels below the variable threshold volume defined as a non-depletion color volume;

selecting a full range ink volume defining a largest number of the total primary color units assigned to any one associated pixel color, the full range ink volume of each one of the multiple pixels between the threshold volume and the full range ink volume defining a depletion color volume;

selecting a maximum total ink volume greater than the variable threshold ink volume defining a maximum volume of ink applied within a given area of a print medium for any one associated pixel color;

depleting the individual ink volume of each one of the multiple pixels having a depletion color volume, each of the individual pixels having an associated ink volume depleted according to the maximum total ink volume and proportional to the individual ink volume assigned to each one of the pixels thereby reducing the ink volume assigned to each depletion color volume while maintaining a linear relationship between the depleted individual ink volumes; and outputting the depleted individual ink volume from the printing system.

16. A method of limiting ink volume to improve quality of a printed image in a liquid ink printing system arranged to receive multiple pixels of digital source image data, the source image data including a specified ink volume for each one of the multiple pixels with a combination of primary colors having a predefined volume ratio, the method comprising the steps of;

maintaining the volume ratio between primary colors in each one of the pixels;

selecting a maximum total ink volume;

individually depleting the specified ink volume so as to generate a depleted total ink volume for each one of the multiple pixels of the source image data by an associated amount according to the maximum total ink volume and proportional to the specified ink volume so that the depleted total ink volume for each one of the multiple pixels is less than or equal to the selection maximum total ink volume; and outputting the depleted ink volume from the printing system for each one of the multiple pixels.

* * * * *

UNITED STATES PATENT AND TRADEMARK OFFICE
CERTIFICATE OF CORRECTION

PATENT NO. : 5,633,662
DATED : May 27, 1997
INVENTOR(S) : Allen et al.

It is certified that error appears in the above-identified patent and that said Letters Patent is hereby corrected as shown below:

Column 1 (line 51), delete "Create" and insert therefor --create--.

Column 2 (line 65), delete "C,M" and insert therefor --C, M--.

Column 3 (line 24), delete "2'2" and insert therefor --2 x 2--.

Column 5 (line 1), delete "24 bits" and insert therefor --24-bits--.

Column 5 (line 41), the sentence "An appropriate maximum..." starts a new paragraph.

Column 7 (line 33), the sentence "Accordingly, our..." starts a new paragraph.

Column 8 (line 28), delete "in" (second occurrence) and insert therefor --In--.

In the Claims

Column 10 (line 11), after "includes:" insert --providing a respective threshold total ink volume and a respective maximum--.

UNITED STATES PATENT AND TRADEMARK OFFICE
CERTIFICATE OF CORRECTION

PATENT NO. : 5,633,662
DATED : May 27, 1997
INVENTOR(S) : Allen et al.

Page 2 of 2

It is certified that error appears in the above-identified patent and that said Letters Patent is hereby corrected as shown below:

Column 10 (line 11), delete "imum".

Column 11 (line 7), delete "Ink" and insert therefor --ink--.

Column 11 (line 45), delete ", the primary color units".

Column 12 (line 1), delete "variable".

Column 12 (line 4), delete "the".

Column 12 (line 43), delete "selection" and insert therefor --selected--.

Signed and Sealed this

Twenty-fourth Day of November, 1998

Attest:

BRUCE LEHMAN

*Attesting Officer*    Commissioner of Patents and Trademarks